US009667093B2

(12) United States Patent
Scheucher

(10) Patent No.: US 9,667,093 B2
(45) Date of Patent: May 30, 2017

(54) TRANSPORTABLE POWER PLANT APPARATUS AND METHOD

(71) Applicant: Karl F. Scheucher, Waite Hill, OH (US)

(72) Inventor: Karl F. Scheucher, Waite Hill, OH (US)

( * ) Notice: Subject to any disclaimer, the term of this patent is extended or adjusted under 35 U.S.C. 154(b) by 370 days.

(21) Appl. No.: 14/088,384

(22) Filed: Nov. 23, 2013

(65) Prior Publication Data

US 2014/0145668 A1    May 29, 2014

Related U.S. Application Data

(60) Provisional application No. 61/729,574, filed on Nov. 24, 2012.

(51) Int. Cl.
*H02J 7/35* (2006.01)
*H02J 7/00* (2006.01)

(52) U.S. Cl.
CPC .............. *H02J 7/35* (2013.01); *H02J 7/0027* (2013.01); *H02J 7/0042* (2013.01); *H02J 7/0055* (2013.01); *H02J 7/355* (2013.01); *Y02T 10/7055* (2013.01)

(58) Field of Classification Search
CPC .............................. H02J 7/0027; H02J 7/0054
See application file for complete search history.

(56) References Cited

U.S. PATENT DOCUMENTS

| | | | | |
|---|---|---|---|---|
| 2008/0053716 A1* | 3/2008 | Scheucher | .......... | B60L 11/1861 180/2.1 |
| 2008/0169923 A1* | 7/2008 | Belden | .......... | A47F 7/024 340/568.3 |
| 2008/0258677 A1* | 10/2008 | Lee | .......... | H02J 7/0027 320/101 |
| 2009/0157907 A1* | 6/2009 | Chapman | .......... | H02J 7/0027 710/8 |
| 2010/0065297 A1* | 3/2010 | Gunderman | .......... | H04M 19/08 174/66 |
| 2010/0176762 A1* | 7/2010 | Daymude | .......... | H02J 7/0044 320/115 |
| 2010/0253145 A1* | 10/2010 | King | .......... | B60L 1/006 307/46 |
| 2011/0234150 A1* | 9/2011 | Furukawa | .......... | H02J 7/0027 320/101 |
| 2011/0266996 A1* | 11/2011 | Sugano | .......... | B60L 3/003 320/104 |

(Continued)

*Primary Examiner* — Vuthe Siek
*Assistant Examiner* — Aric Lin
(74) *Attorney, Agent, or Firm* — Woodling, Krost and Rust

(57) ABSTRACT

Mechanical, electronic, and business method facets are combined to create a highly integrated transportable power plant. A vehicle system incorporates and transports and electrical system capable of using alternating current and direct current electrical power inputs to charge onboard energy storage modules. The electrical system also provides alternating current and direct current electrical outputs via a bank of interoperable connectors whereby appliances such as cell phones and battery operating lighting products may be efficiently recharged. An enclosure of the vehicle system protects the electrical components, provides shelter for the operator, supports roof-mounted, flexible photovoltaic panels, and provides shelf surfaces for organizing and protecting devices being recharged.

4 Claims, 18 Drawing Sheets

(56) References Cited

U.S. PATENT DOCUMENTS

| | | | | |
|---|---|---|---|---|
| 2012/0268064 A1* | 10/2012 | Ostrom | ................ | G06F 1/26 320/108 |
| 2012/0303259 A1* | 11/2012 | Prosser | ................ | H02J 7/0054 701/400 |
| 2013/0257346 A1* | 10/2013 | Jakins | ................ | H02J 7/355 320/107 |
| 2014/0375272 A1* | 12/2014 | Johnsen | ................ | B60L 11/16 320/136 |

* cited by examiner

TRANSPORTABLE POWER PLANT APPARATUS AND METHOD

This application claims priority to, and the benefit of copending U.S. Provisional patent application Ser. No. 61/729,574 filed Nov. 24, 2012 which is incorporated herein by reference hereto in its entirety.

FIELD OF THE INVENTION

The field of invention is the field of transportable power systems.

BACKGROUND OF THE INVENTION

There is a clear need for electric power in most areas of the world. The need is present and often persists unaddressed where electric infrastructure is lacking, where electric infrastructure has sustained damage with prolonged power outages, and where events draw large crowds of individuals under circumstances where electric outlets are not readily accessible.

As an example of an area lacking electric infrastructure, consider developing regions of Africa, rural areas in particular. Some estimates place the number of individuals living in grid-deprived circumstances to approach two billion worldwide. The lack of electric infrastructure becomes significant when one considers the cell phones and rechargeable electric lights that have become mainstays of life quality in these areas. Current estimates suggest that the cell phone users in Africa now outnumber those in North America. At present, there are very few options open to those individuals needing to recharge these important appliances. The present invention addresses this need in an innovative and efficient way. As a further benefit, it opens micro-business opportunities to the constituents in these regions: namely the opportunity to own and operate the transportable power plant for profit and for the welfare of indigenous customers.

Soon after a weather or manmade disaster causes a widespread power outage, the cell phones, flashlights, and other electric appliances the effected population depends upon become discharged and useless. The present invention is easily deployed on an emergency basis and will provide portable power for use by those effected individuals.

Circumstances such as sporting events, religious gatherings, political events and particular venues such as amusement parks and musical concert settings draw large numbers of people, most of whom rely upon rechargeable electronic devices such as cell phones, digital cameras, video cameras, tablet computers, etc. for the duration of the event. Electricity is joining resources such as water, food, and sanitation as a basic safety and comfort requirement at such events. The present invention, analogous to a food or beverage vending cart, provides transportable electric power for event goers.

The transportable power plant utilizes a variety of alternating current and direct current power sources to replenish its onboard energy stores, and can provide alternating current and direct current power outputs to recharge the aforementioned appliances. Useable power sources include photovoltaic panels (solar panels), wind power, grid power, and many other sources.

SUMMARY OF THE INVENTION

Although this patent application emphasizes the use of the invention for charging cell phones, rechargeable lights, and such small appliances, it is an important goal of the invention to be readily adaptable to many different transportable electric power applications.

This invention combines the mechanical, electronic, and business method facets needed to create a transportable power plant and operate a micro-business based upon its use. One transportable power plant can be deployed for several hundred users who will continue to utilize it for recharging cell phones and other appliances every two to three days.

Being transportable is a particular advantage because the power can be brought to the users in need. This is vastly more efficient than all of the users having to travel to obtain the needed electric power. Transportability is also important when the power plant needs to travel to available energy sources to replenish its onboard energy stores.

The present invention incorporates features for ease of use and maintainability. Power outlets use universal connector designs that accept electrical plug styles from around the world. Energy subsystems are modular providing redundancy protection against point component failures. Modules may be easily removed from and installed to the plant facilitating both external charging of the modules, external use of a module as a standalone generator, and expeditious replacement of a discharged or failed module with a charged functioning module. The latter feature allows the plant energy stores to be "instantly" rejuvenated by exchanging a discharged module for a charged one.

DESCRIPTION OF THE INVENTION

Figure 1:
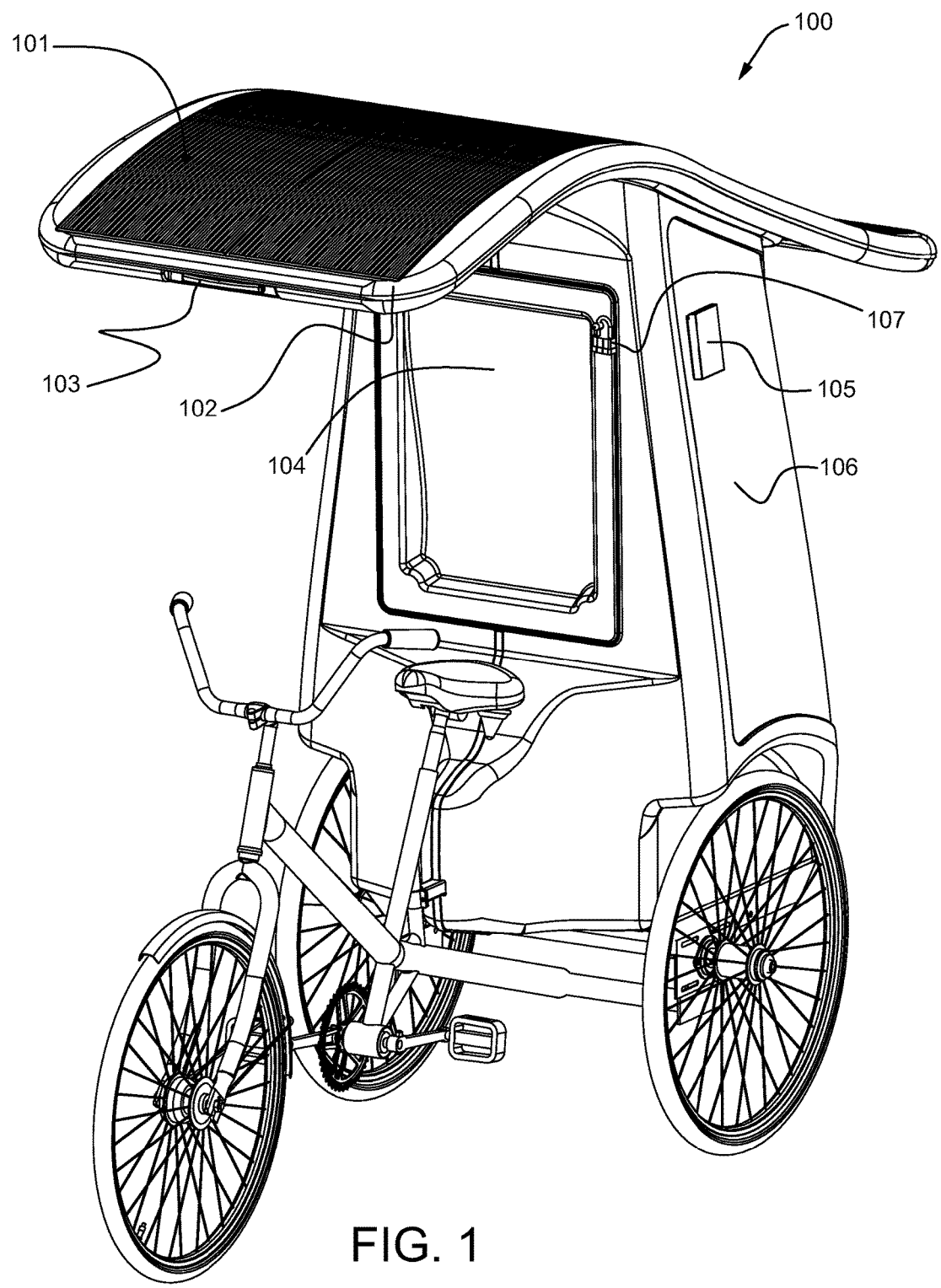
FIG. 1 is a transportable power plant, perspective view.

FIG. 1 shows a preferred embodiment 100 of the instant transportable power plant invention.

The transportable power plant (plant hereafter) comprises a vehicle, a full-sized industrial tricycle in the preferred embodiment. The tricycle may be powered by operator pedaling. A three speed or alternative transmission may also be utilized to provide advantageous gear ratios for travel over a variety of terrain conditions. Because the plant has onboard electrical energy, it is contemplated in the present invention to provide electric drive motor assistance as well as regenerative braking energy capture to further expand the range of use of the vehicle. Other types of vehicles are contemplated as part of the instant invention including but not limited to carts, boats, rail cars, automobiles, trucks, and aircraft. Each of these vehicles types can be readily adapted to the electrical subsystem of this invention and provide accessibility to a wide range of geographic locations where the plant is needed and useful.

The vehicle has an enclosure 106 mounted upon a platform over the rear axle.

The enclosure has an access door 104 for accessing the inside of the enclosure. The enclosure also has a wire access port 105 through which wires carrying input or output power may pass even when the aforementioned access door is closed and secured with lock 107. The enclosure also has a roof 102. The roof provides shelter from elements for the operator and supports flexible photovoltaic panels 101 which provide input power to the plant.

A headlight 103 operates on stored energy when needed for safe operation in darkness. A tail light (not shown) is also energized using onboard energy for safe operation when required.

Figure 2:
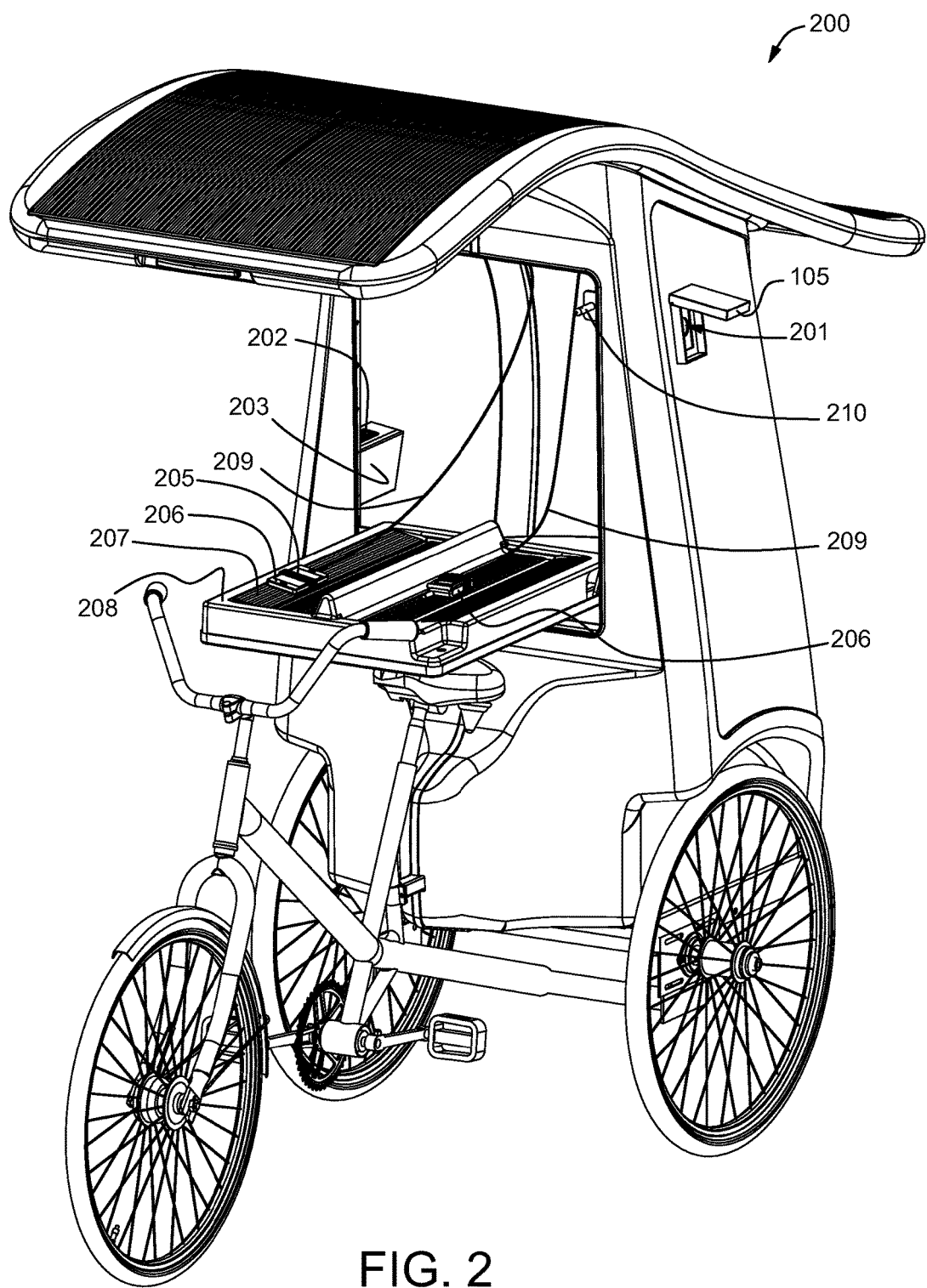
FIG. 2 is a transportable power plant, perspective view, door open.

FIG. 2 shows another view of the preferred embodiment 200 with the door opened. The enclosure houses an electrical power input and distribution module 203. The wire access port 105 is shown opened exposing through hole 201 leading to the interior of the enclosure. Door 104 when opened as shown provides a shelf surface 208 which has adhesive material such as the hook fabric of a hook-and-loop fastening system 207 affixed to it. Cell phones 206 having bands of hook-and-loop material attached loop side out 205 are attached to the shelf. Charging cables 209 are run from the phones to the interior of the enclosure where the charging modules are plugged into the power output panel shown in a subsequent view. Locking post 210 is also shown with the lock removed to allow the door to be opened as shown.

Figure 3:
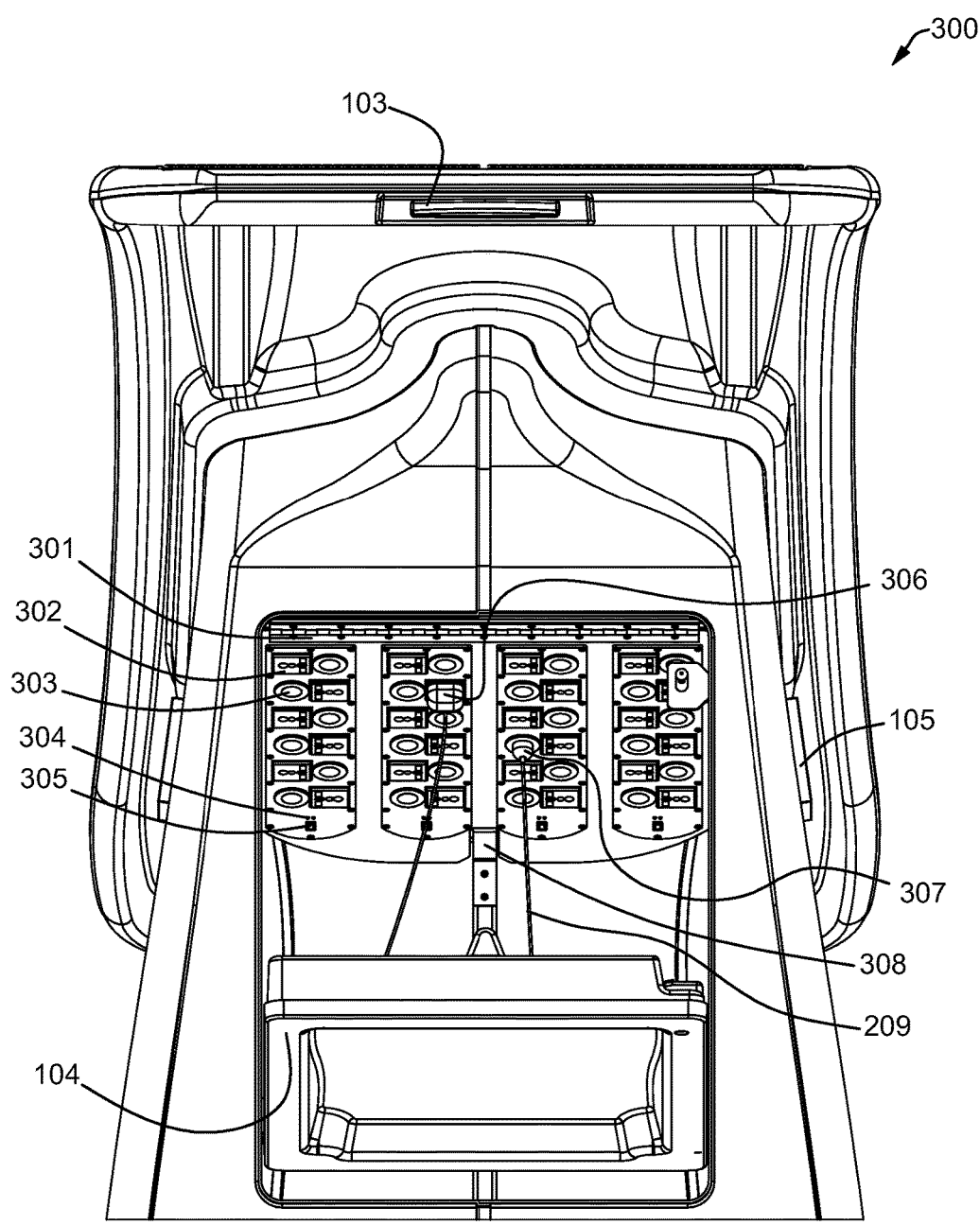
FIG. 3 is an electrical power output distribution module, retracted position, looking upward through door opening.

Looking from the front of the tricycle slightly upward into the interior of the enclosure, FIG. 3 shows the electrical power output module in the retracted position with phone charger 306 plugged in to alternating current power output connector 302 and phone charger 307 plugged in to direct current power output connector 303. Switch 305 is used to control an energy storage module (shown in subsequent figures) and light 304 indicates the status of the energy module. A retaining clip 308 retains the electrical power output module in the retracted position until the clip is pressed and moved to disengage the retracted module allowing the module to swing downward and forward on hinge 301 into the door opening.

Figure 4:
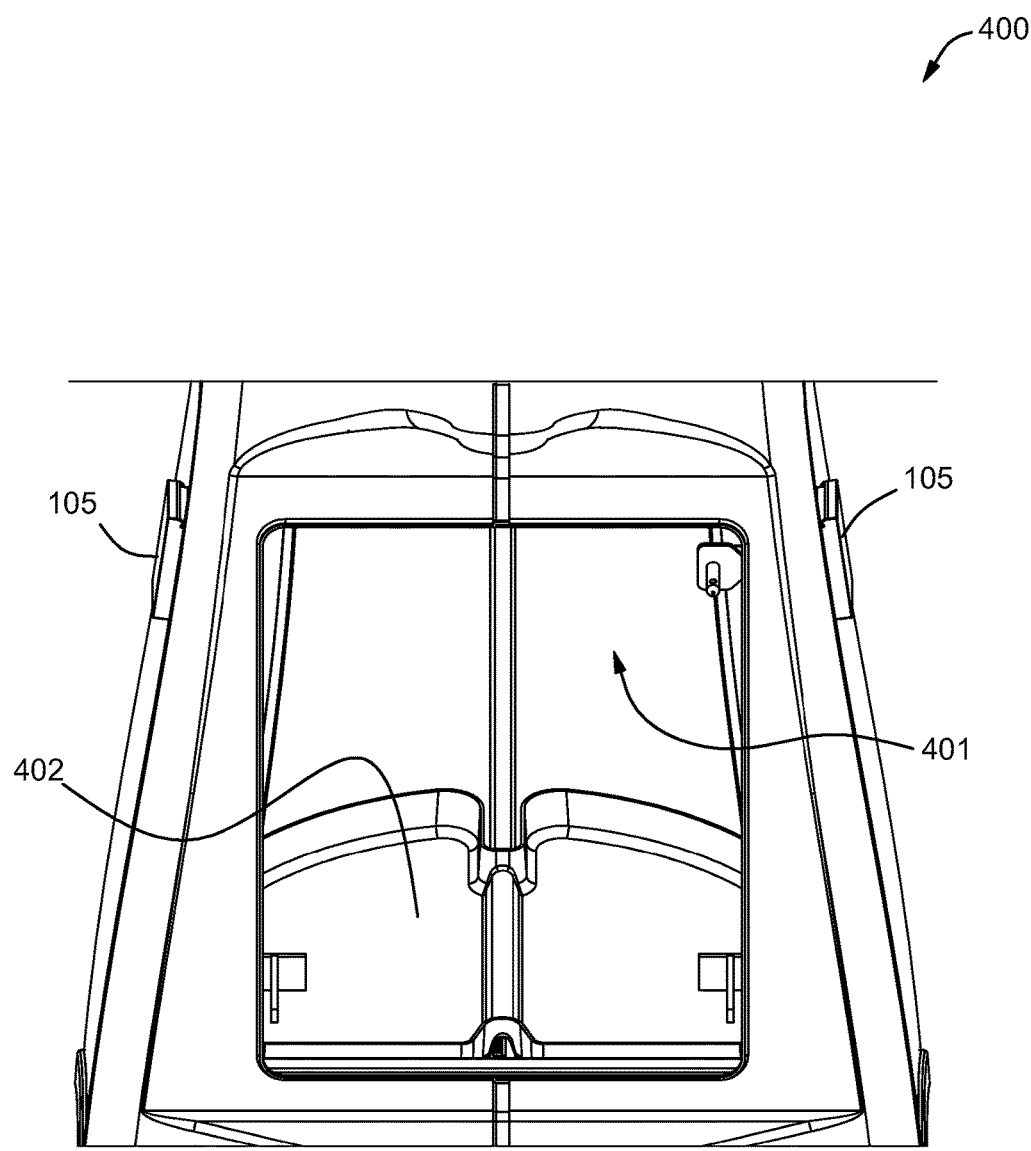
FIG. 4 is an internal shelf looking downward through door opening.

FIG. 4 is a view 400 looking from the front of the plant slightly downward through door opening 401 into the interior of the enclosure wherein interior utility shelf 402 can be seen. Shelf 402 is useable for general storage of equipment and materials and can also be used to support appliances such as cell phones being recharged by the plant. The energy modules reside below and support shelf 402.

Figure 5:
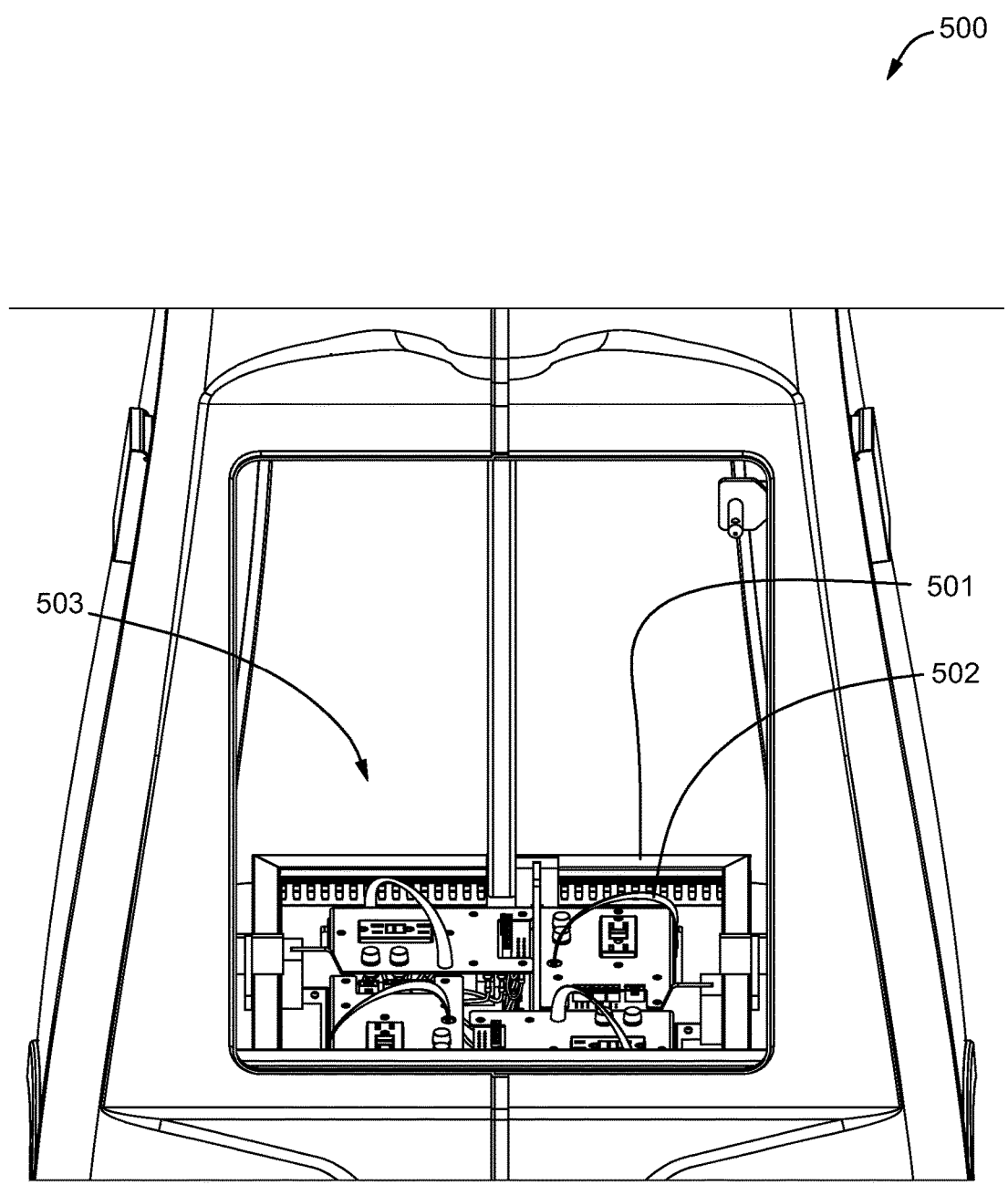
FIG. 5 is an energy storage subsystem looking downward through door opening with internal shelf removed.

FIG. 5 is a front-downward view 500 similar to 400 with shelf 402 removed to bring energy storage subsystem 503 into view. Energy module handles 502 can be seen and are used to conveniently lift the energy module up and out of the enclosure when desired. Wire duct 501 is used to organize and route the wires carrying power inputs and outputs between the energy modules and the power input and power output distribution modules.

Figure 6:
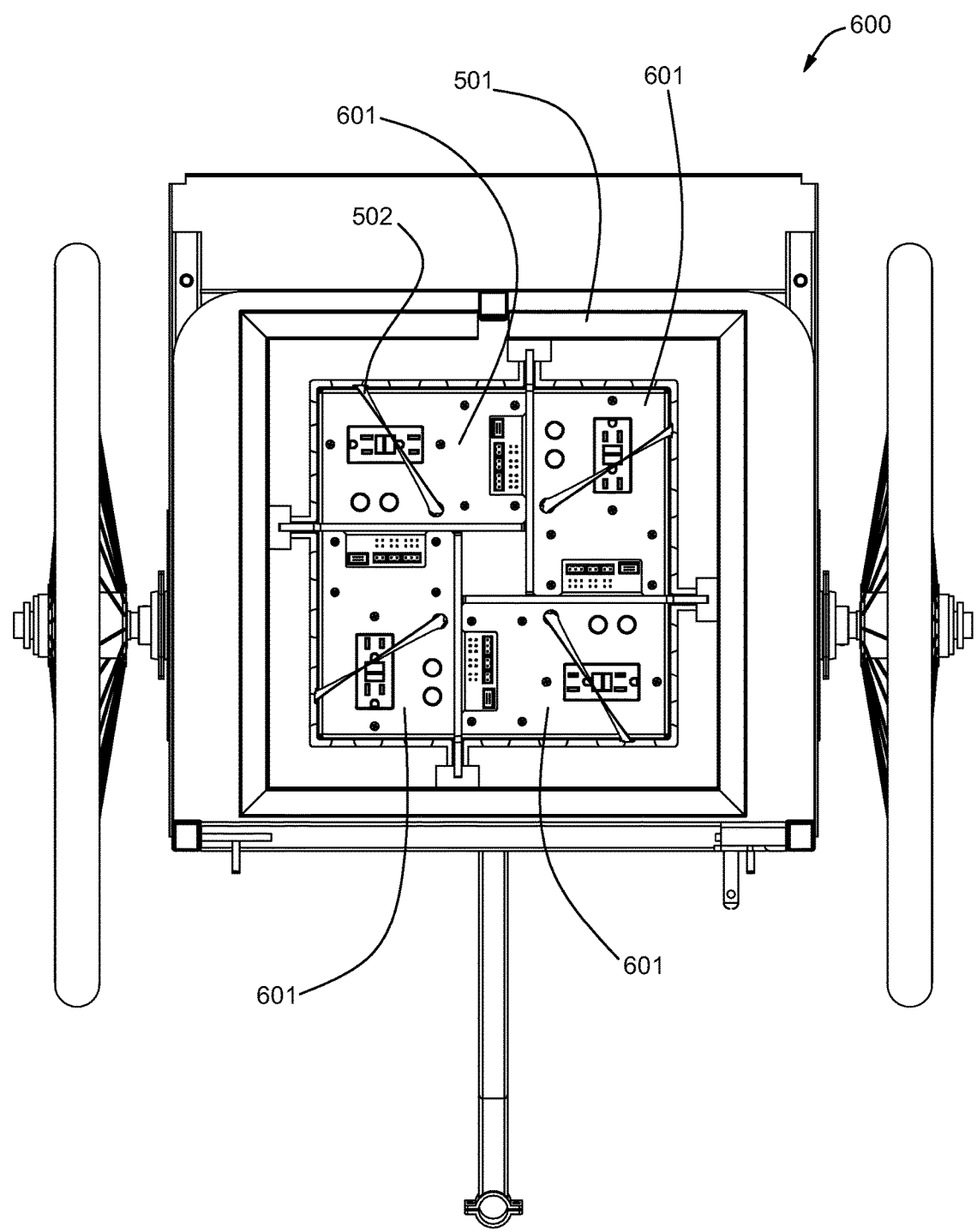
FIG. 6 is an energy storage subsystem looking downward with enclosure removed.

FIG. 6 is a directly downward view 600 of the energy storage subsystem with the enclosure removed for easy visualization of four energy modules 601.

Figure 7:
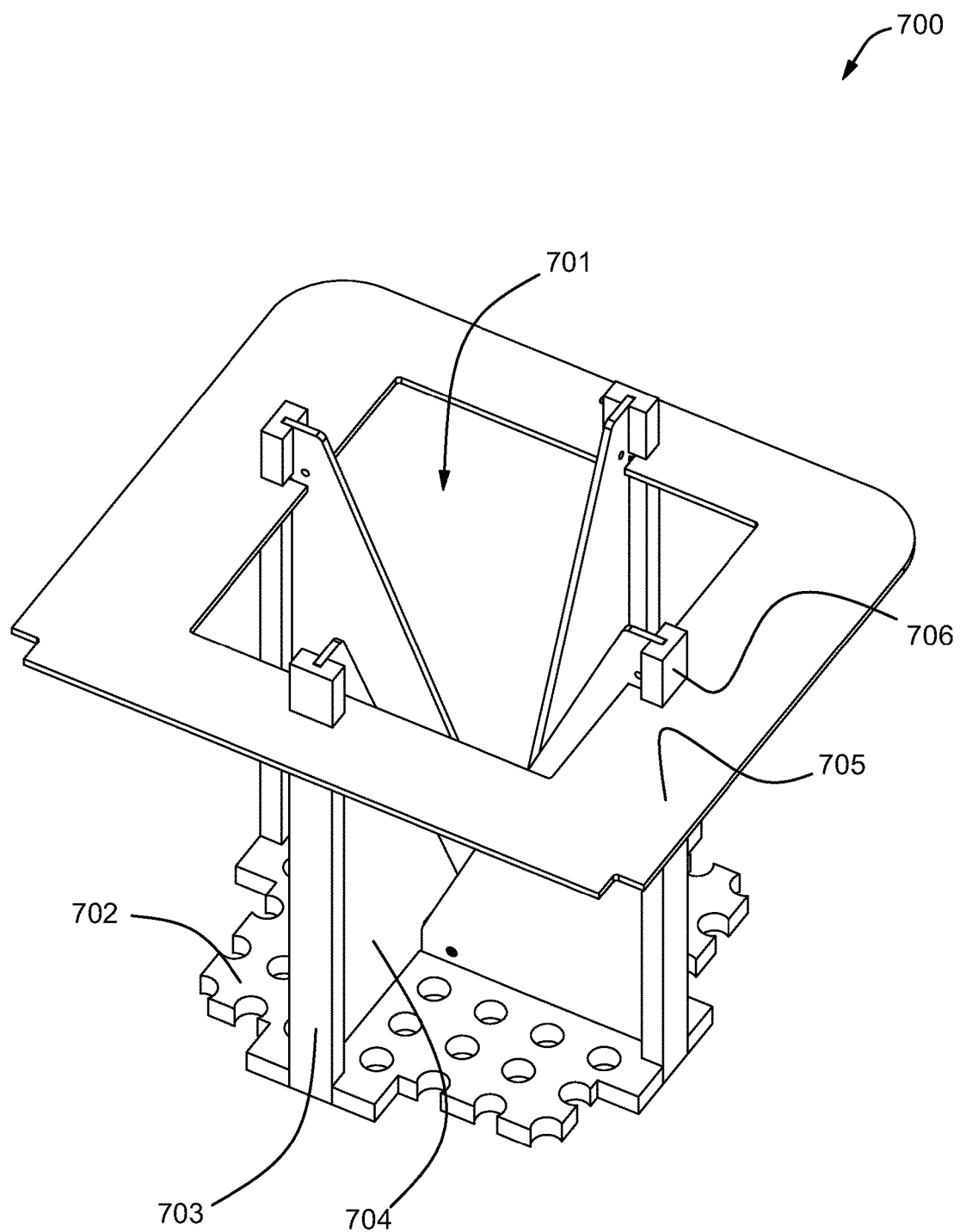
FIG. 7 is an energy storage module receiving structure.

The structure that accepts and retains the energy modules is the energy module receiving structure depicted in FIG. 7 in perspective view 700. Several components are assembled to create energy module receiving bays 701. These components include a base plate 702 which is perforated in a fashion to both reduce weight and improve airflow from the base up through the energy modules for cooling purposes. Vertical strut 703 in combination with vertical septum 704 forms a wall dividing the receiving structure into four receiving bays. The interlocking horizontal flange 705 ties the dividing walls together and to the infrastructure frame of the enclosure. The dividing walls so constructed and interlocked with the enclosure frame provide robust support for the inserted energy modules. Additional spacing blocks 706 sit on top of the horizontal flange 705 creating support for previously described shelf 402 and clearance for wire organizing duct 501.

Figure 8:
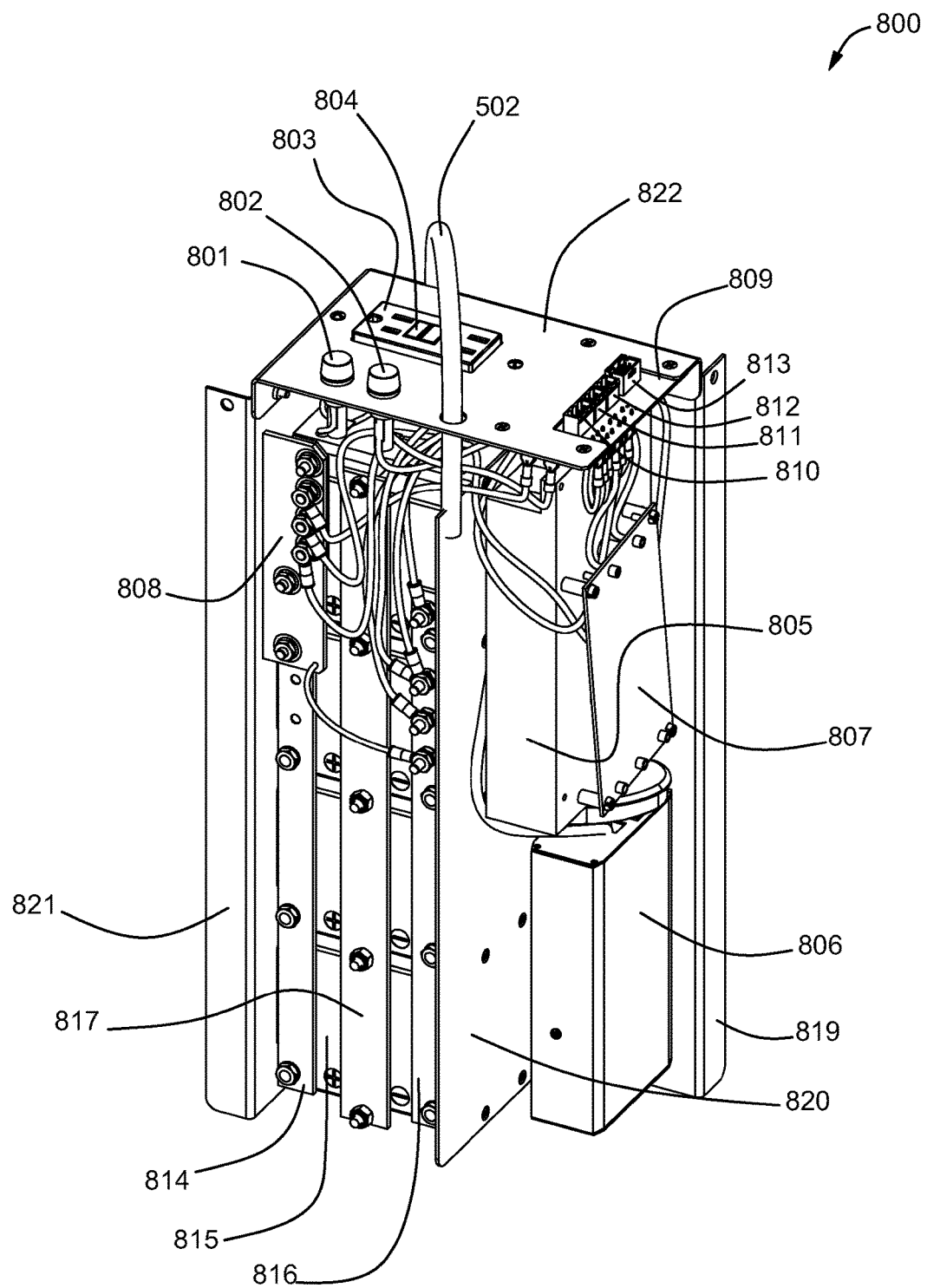
FIG. 8 is an energy module.

FIG. 8 shows an individual energy module in perspective view 800. It is an important aspect of the invention that anywhere from one to many energy modules may be used in the operation of a single plant. Four such modules are depicted in the preferred embodiment, but even then the plant may operate with three, two, or a single module. More than four modules may be utilized in alternate embodiments. Electrical energy storage components 815 are preferentially lightweight, high-energy rechargeable battery modules such as batteries of the lithium-ion chemistry type. Alternatively, rechargeable batteries of other chemistries such as NiCd, NiMH, lead-acid, and other types may be utilized without deviating from the intent of the instant invention.

Alternating current to direct current converter 805 receives alternating current power via connector 810 producing direct current output power which is routed to charge controller module 807. Charge controller module 807 also receives power from input connector 811 and controls charge power delivered to the aforementioned energy storage component 815.

Output power is produced by direct current to alternating current conversion module 806 which receives direct current power from energy storage components and the charge controller and provides alternating current output power via fuse 802 and ground fault detector and interrupter 804 to output connector 803. Direct current output power is also provided directly from energy storage components and charge controller via fuse 801 and output connector 812. Control inputs and status output signals are interfaced by connector 813. The aforementioned connectors are mounted upon interconnection circuit board 809. Over discharge of energy storage components is prevented by protection module 808.

The energy storage components are tied electrically and mechanically by positive bus bar 814 and negative bus bar 816. Intra-module wiring is facilitated by direct, screw-terminal connection to the aforementioned positive and negative bus bars. Additional mechanical function is provided by the energy storage component retaining bar 817. Two vertical flanges 819 and 821 provide structural rigidity for the energy module and are the interfacing surfaces for the energy module receiving structure receiving bays described previously. A vertical interior wall 820 provides separation of the energy storage components and support for the various converter modules. An end plate 822 mounts interface connectors and fuses.

Figure 9:
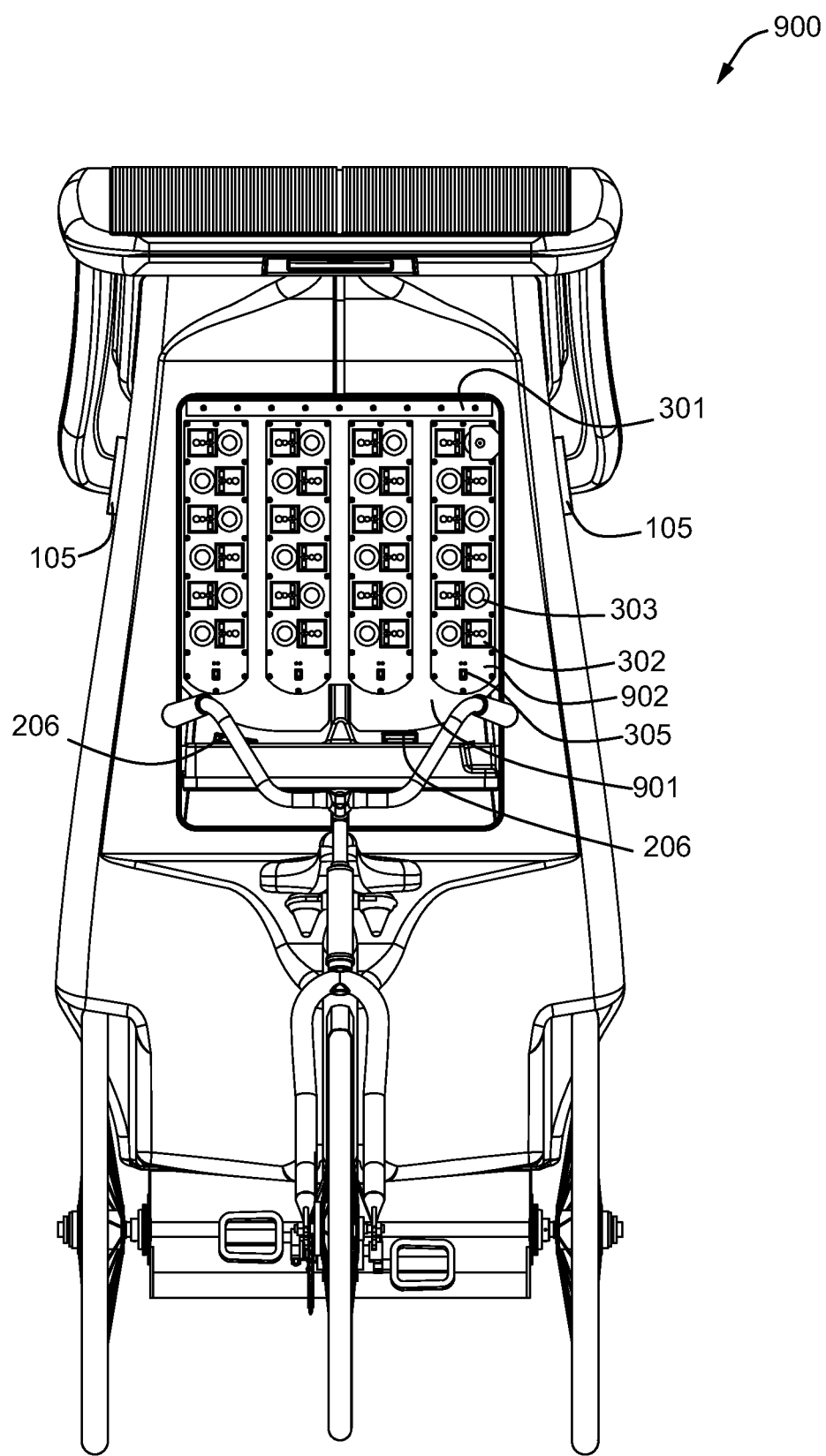
FIG. 9 is an electrical power output distribution module, forward position, looking through door opening.
Figure 10:
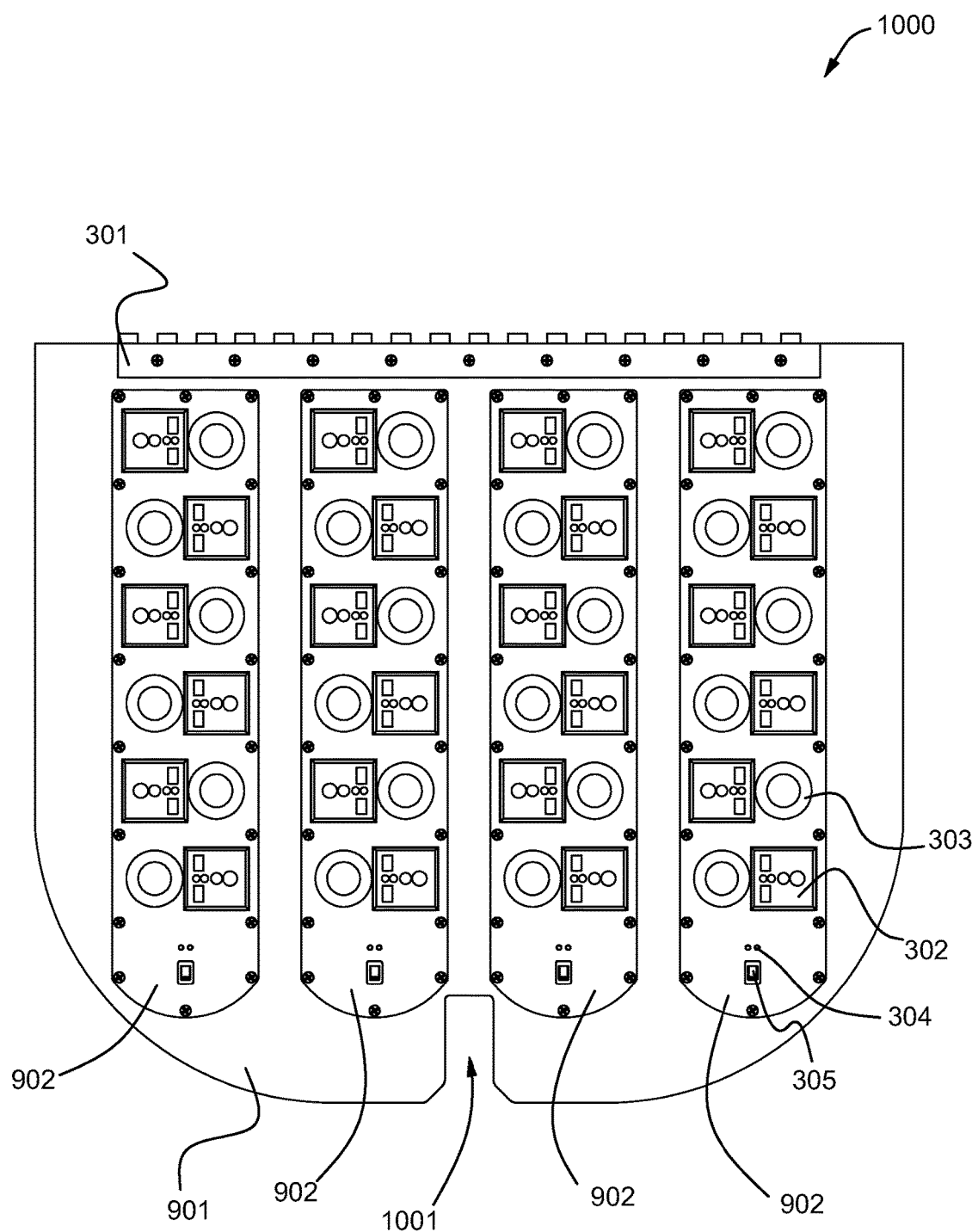
FIG. 10 is an electrical power output distribution module, forward position, looking through door opening.
Figure 11:
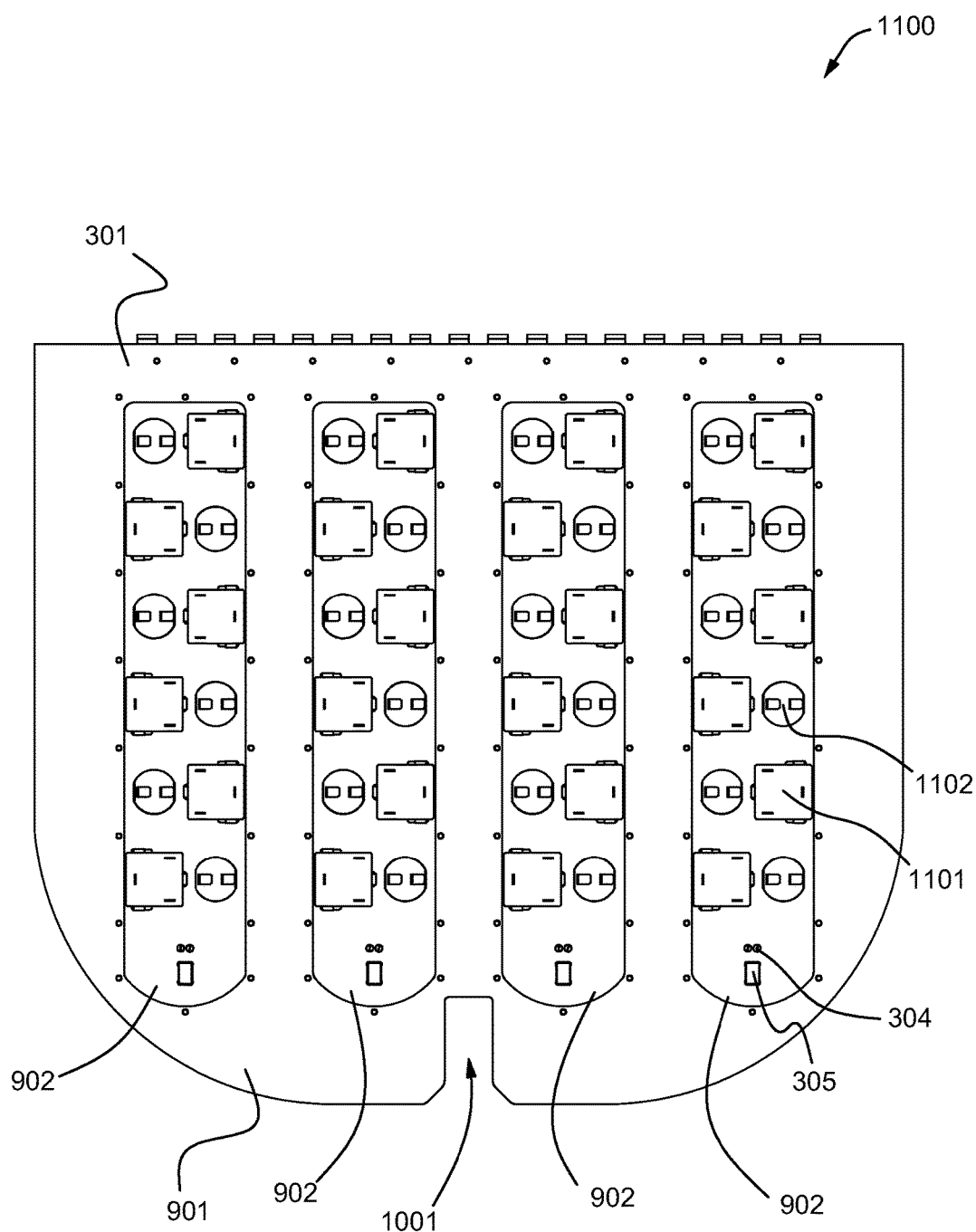
FIG. 11 is an electrical power output distribution module, rear view.

FIGS. 9, 10 and 11 show various aspects of the electrical power output distribution panel. FIG. 9 is a view from the front of the plant 900 showing the output distribution panel in the lowered position. The module can be seen to be constructed from a main panel 901 with mounting locations for output connector sub panels 902. FIG. 10 shows the front side of the output module isolated in a front view 1000. Notch 1001 of the main panel 901 interengages retaining clip 308 when the output panel is in the previously shown retracted position. FIG. 11 shows the output panel isolated in a rear view 1100. The alternating current power input connection 1101 and direct current power input connection 1102 to the output panel are also shown.

Figure 12:
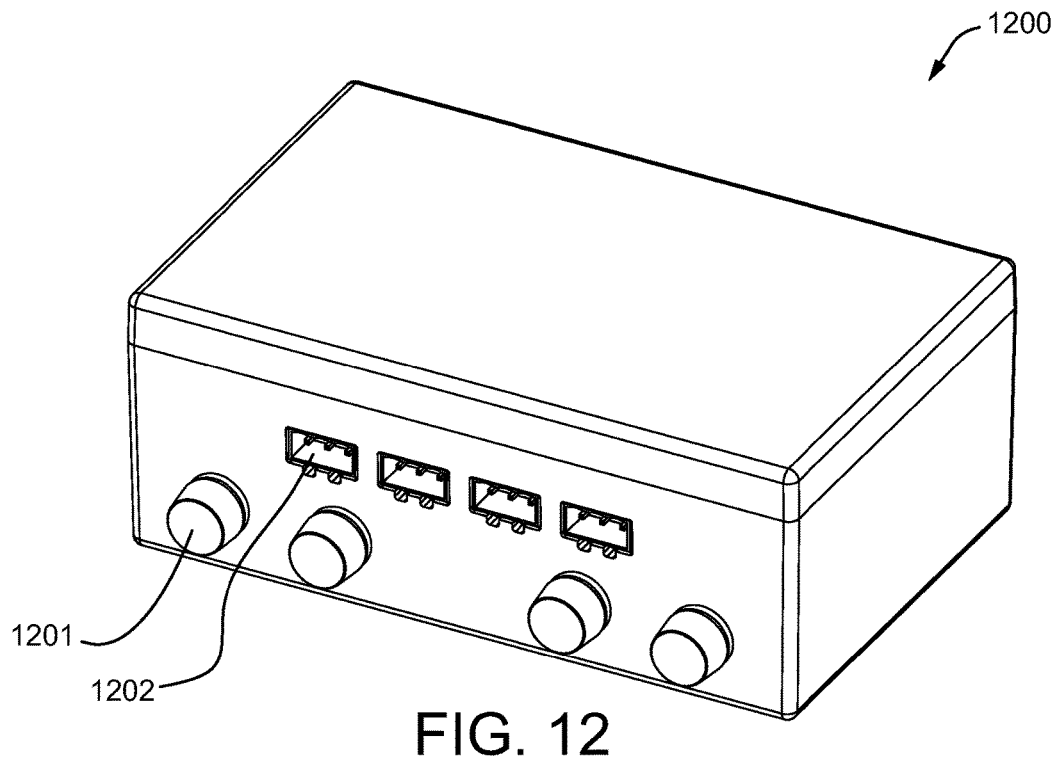
FIG. 12 is an alternating current electrical power input and distribution module output perspective view.
Figure 13:
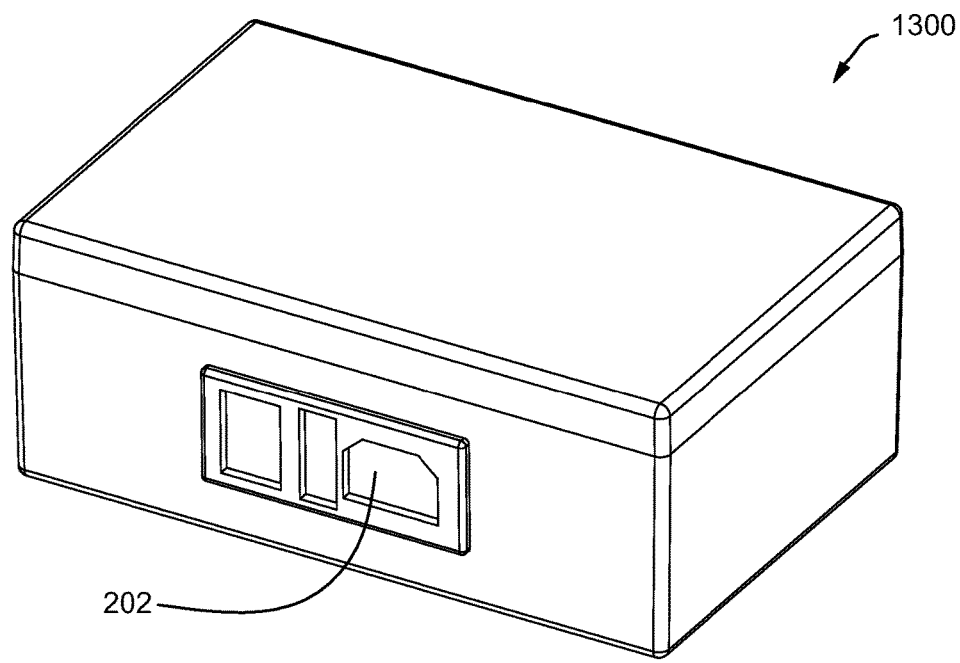
FIG. 13 is an alternating current electrical power input and distribution module input perspective view.

FIGS. 12 and 13 show an alternating current electrical power input and distribution module in perspective views 1200 and 1300. The power input connector 202, power output fuse 1201, and power output connector 1202 are shown. It should be noted that power input connector 202 may be connected to any suitable alternating current electrical power source including grid power, AC generator power, distributed generation and alternative power, etc.

Figure 14:
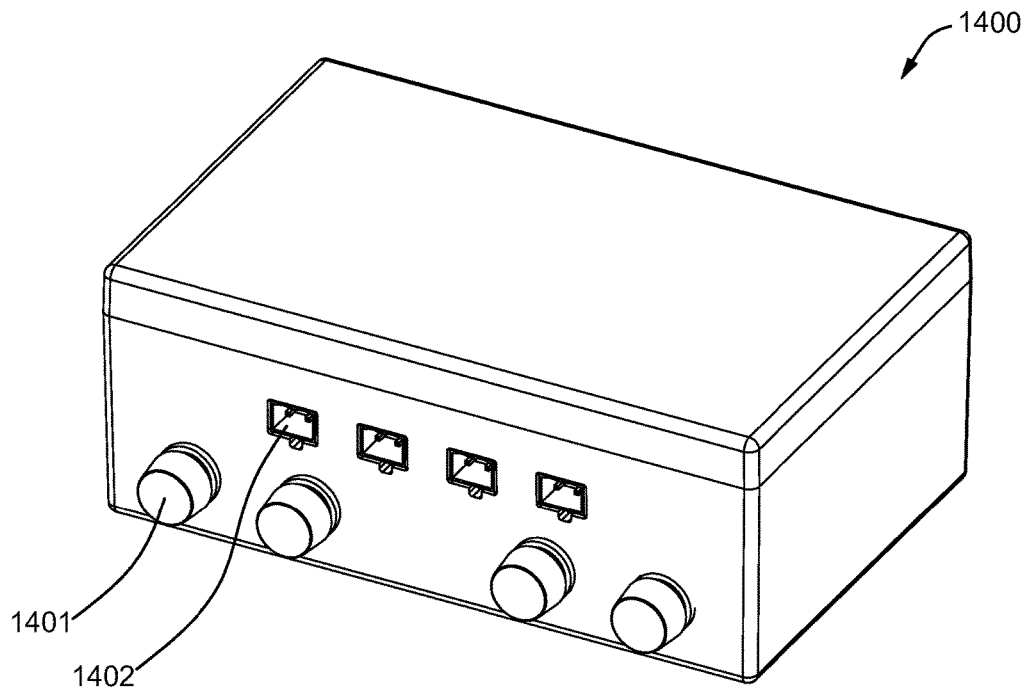
FIG. 14 is an alternating current electrical power input and distribution module output perspective view.
Figure 15:
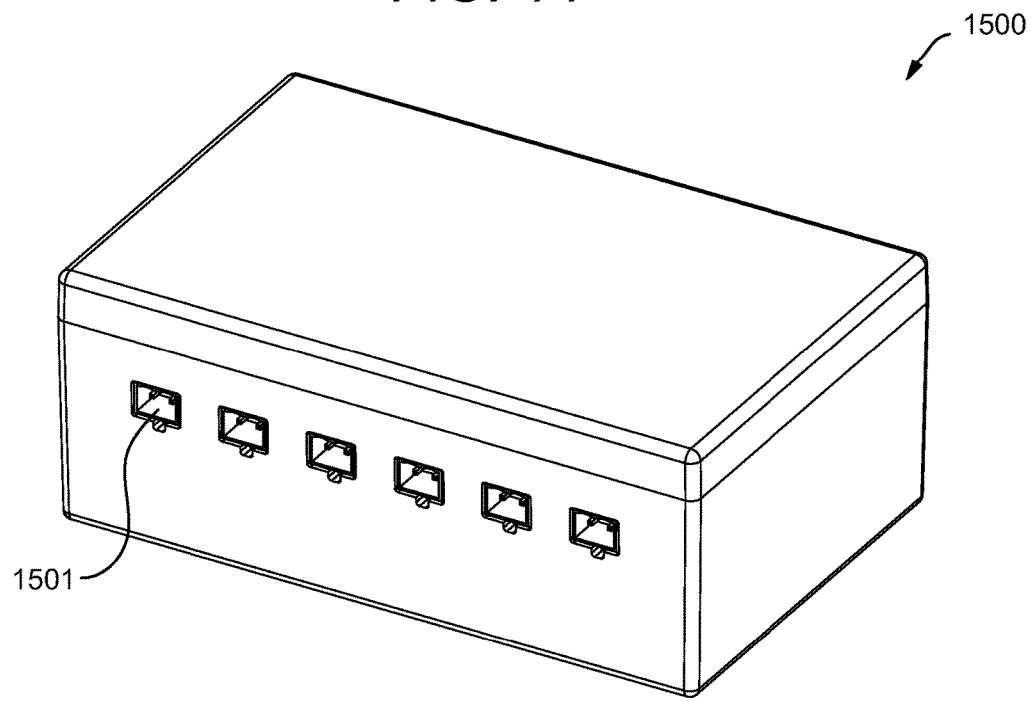
FIG. 15 is an direct current electrical power input and distribution module input perspective view.

FIGS. 14 and 15 show a direct current electrical power input and distribution module in perspective views 1400 and 1500. The power input connector 1501, power output fuse 1401, and power output connector 1402 are shown. It should be noted that power input connector 1501 may be connected to any suitable source of direct current power including photovoltaic panels, vehicle power, external battery power, etc.

Figure 16:
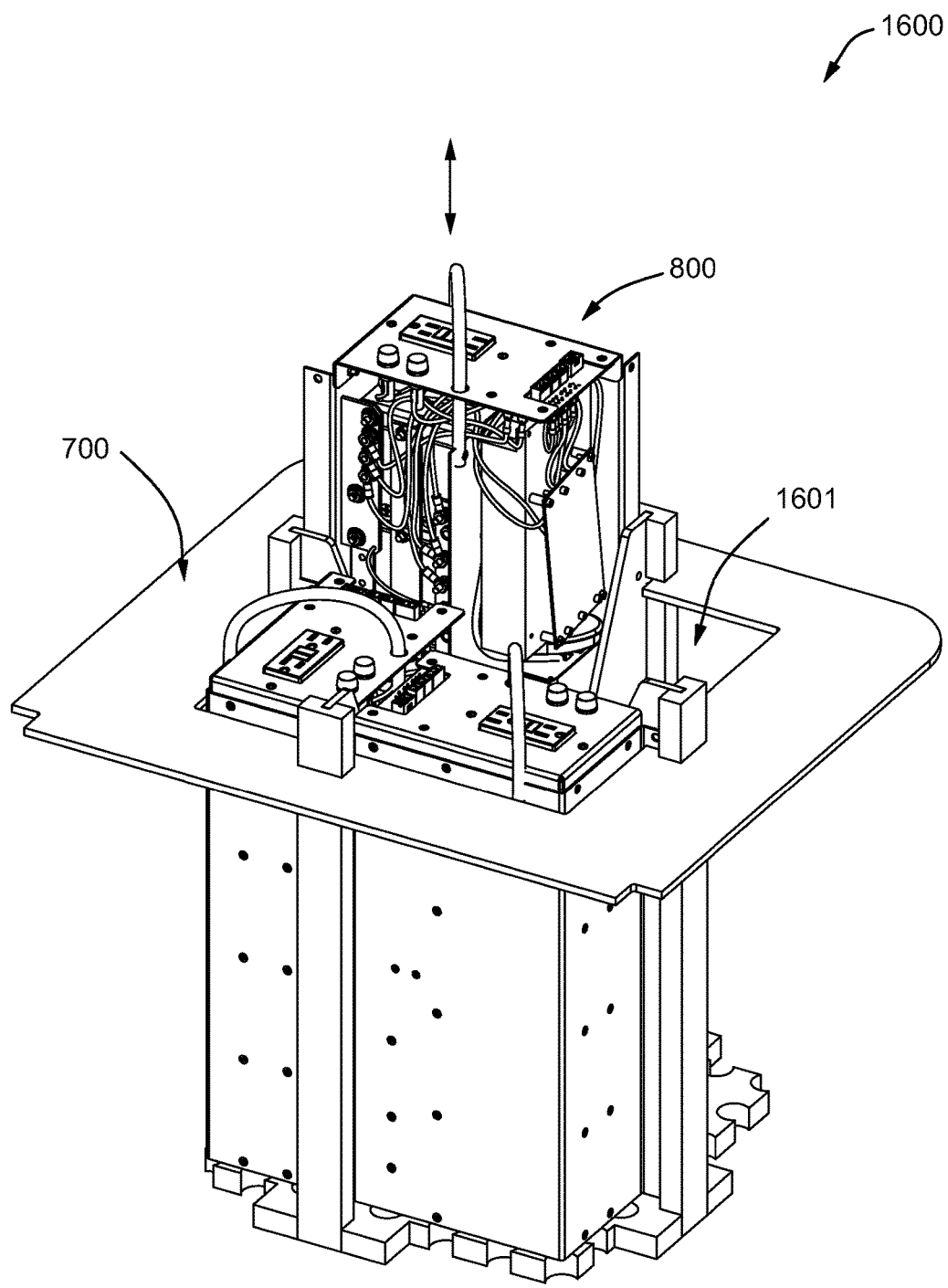
FIG. 16 is an energy storage subsystem.

FIG. 16 is a perspective view 1600 of the energy storage subsystem comprising the energy storage module receiving structure 700 and energy storage modules 800. Two modules can be seen to be seated in place. One module is shown as it is extracted or inserted into a receiving bay. An empty receiving bay 1601 is also shown. It can be seen that vertical flanges 819 and 821 previously described interface the surfaces of vertical septa 704.

Figure 17:
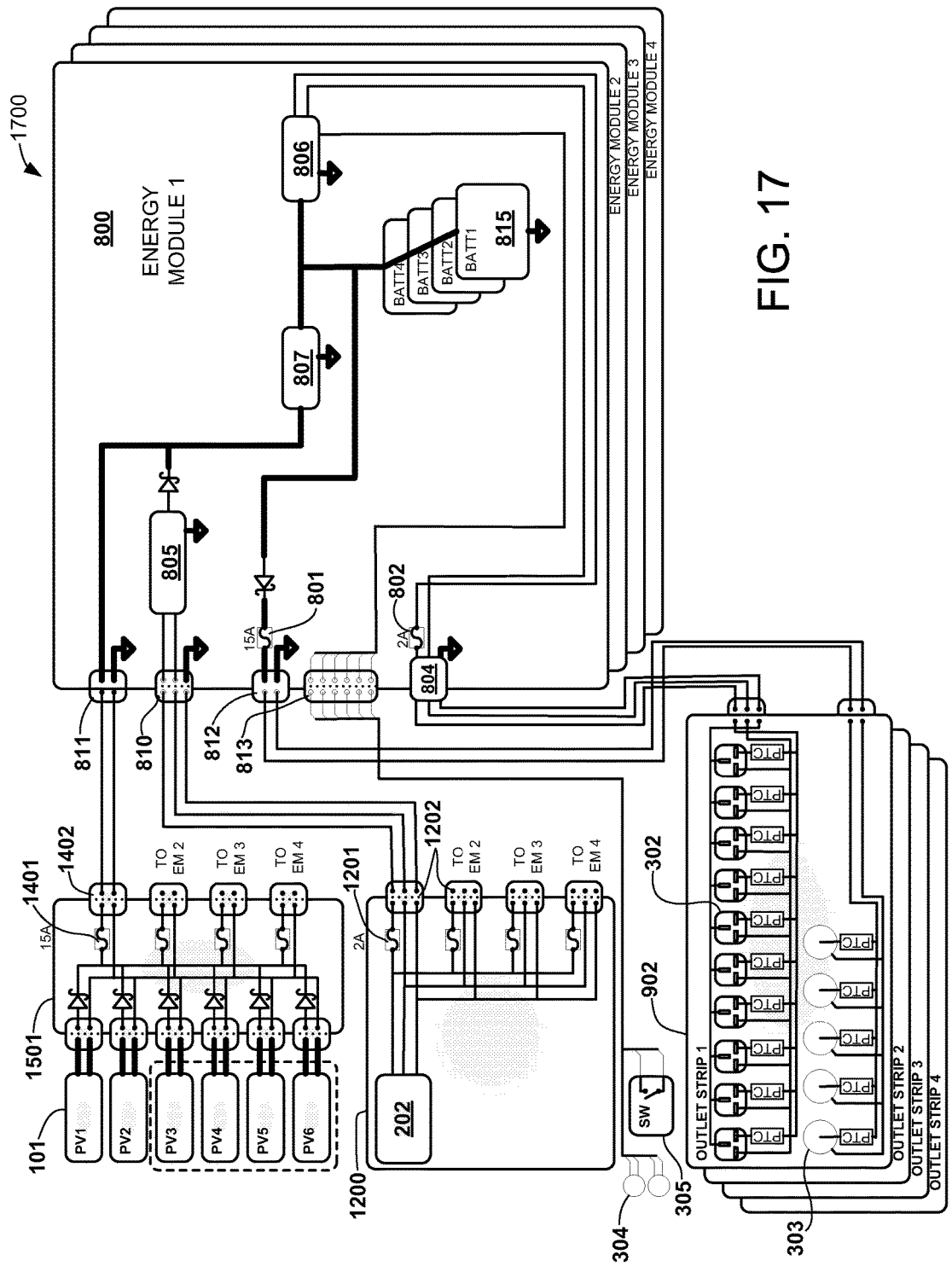
FIG. 17 is a block diagram of the electrical subsystem.

A block diagram of the electrical system of the plant is shown in FIG. 17 as 1700. Energy modules 800 are shown labeled as "ENERGY MODULE" 1 through 4. The features of FIG. 8 including AC to DC converter 805, charge controller 807, and DC to AC converter 806 along with energy storage components BATT 815 are shown. Note the power input and output connectors 810, 811, and 812, control and status connector 813, GFCI 803, and fuses 801 and 802. Also note the incorporation of diode functions to control current flow in the assembly.

The direct current electrical power input and distribution module 1400 is shown connected to PV1 (101) through PV6 while the alternating current electrical power input and distribution module 1200 is shown with the AC INPUT MODULE block 202 inside. The switch 305 and both a red and green light 304 are shown. The power output distribution module 902 is shown as OUTLET STRIP 1 through 4.

Figure 18:
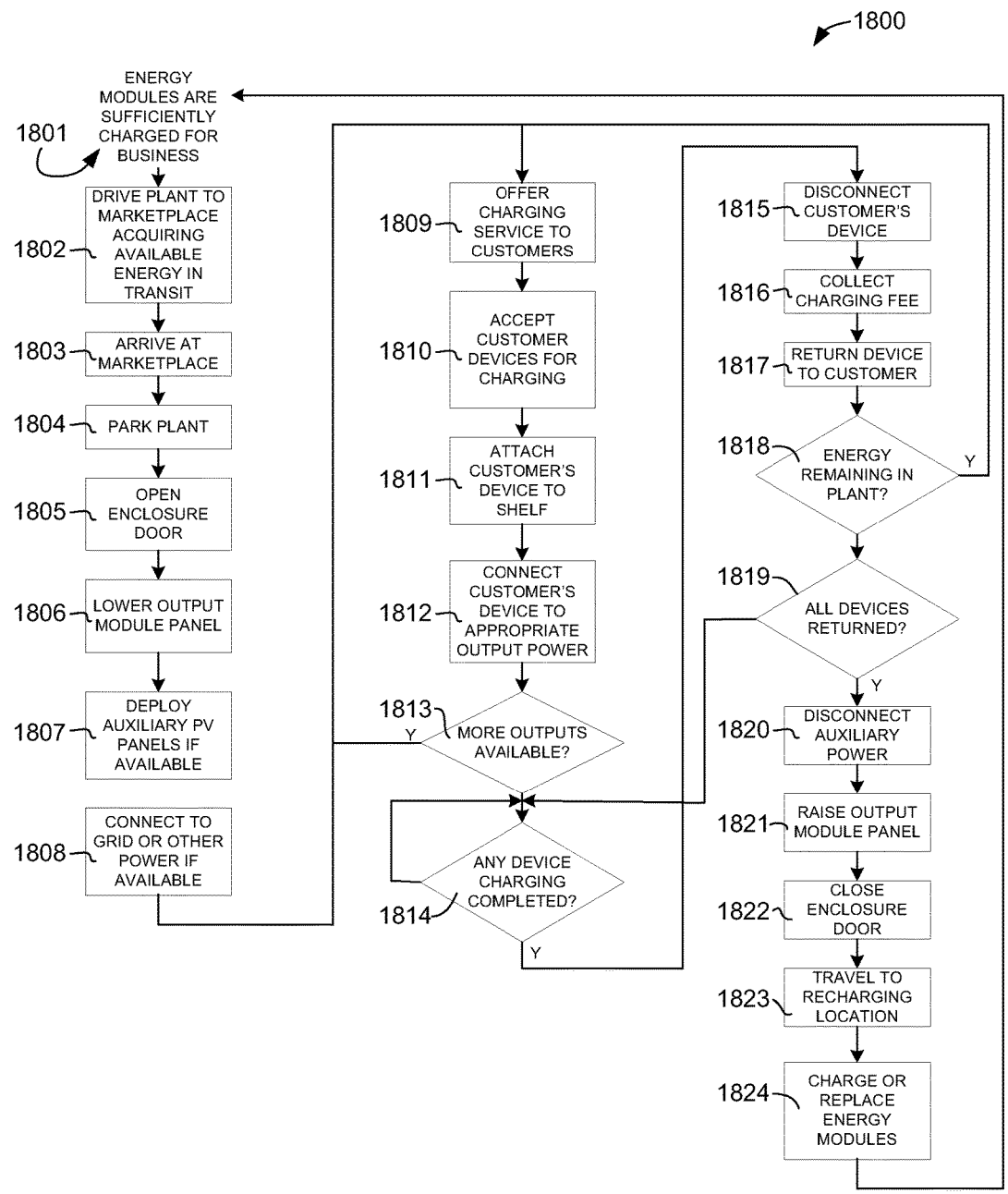
FIG. 18 is a process diagram of the transportable power plant operation.

FIG. 18 is a process flow diagram 1800 of the operation of the plant in an efficient and straight forward manner. Overall operation occurs in repeating charge-discharge cycles. Beginning with the energy modules in the charged state at step 1801, the operator drives the vehicle to the area where he wishes to sell recharging services at step 1802. During transit, if sunlight is available, additional charge energy may be captured from the roof-mounted PV panels also at step 1802. Arriving at the desired charging location, step 1803, the operator parks the vehicle, step 1804, opens the enclosure door, step 1805, and lowers the output module panel, step 1806. If auxiliary PV panels are available they may be deployed and connected at step 1807. Grid, generator, wind, or alternative power may be available at the marketplace and may be likewise connected to the plant at this time at step 1808. The operator may now offer charging service to interested customers at step 1809. A customer presents his cell phone or other appliance for charging, step 1810. The operator attaches a hook-and-loop band around the phone and affixes the phone to the mating hook material on the plant shelf at step 1811. The operator then plugs the phone charger into either an alternating current or direct current output in the output panel, step 1812. Alternatively, the operator may use an AC or DC to USB (universal serial bus) adapter to charge the phone. Alternatively, the operator may use a universal cell phone battery charger, remove the battery from the phone and insert it into the universal charger, and plug the universal charger into either an AC or DC outlet charging the customer's cell phone battery outside and separate from the phone. This process is repeated as long as there are additional customers and available output connectors for charging, step 1813. At any time, the phones being securely affixed to the enclosure shelf, the door may be closed and optionally secured with a lock. The operator can even move the vehicle to a new location to take on additional phones for charging circling back to deliver the first phones as they become charged.

Figure 19:
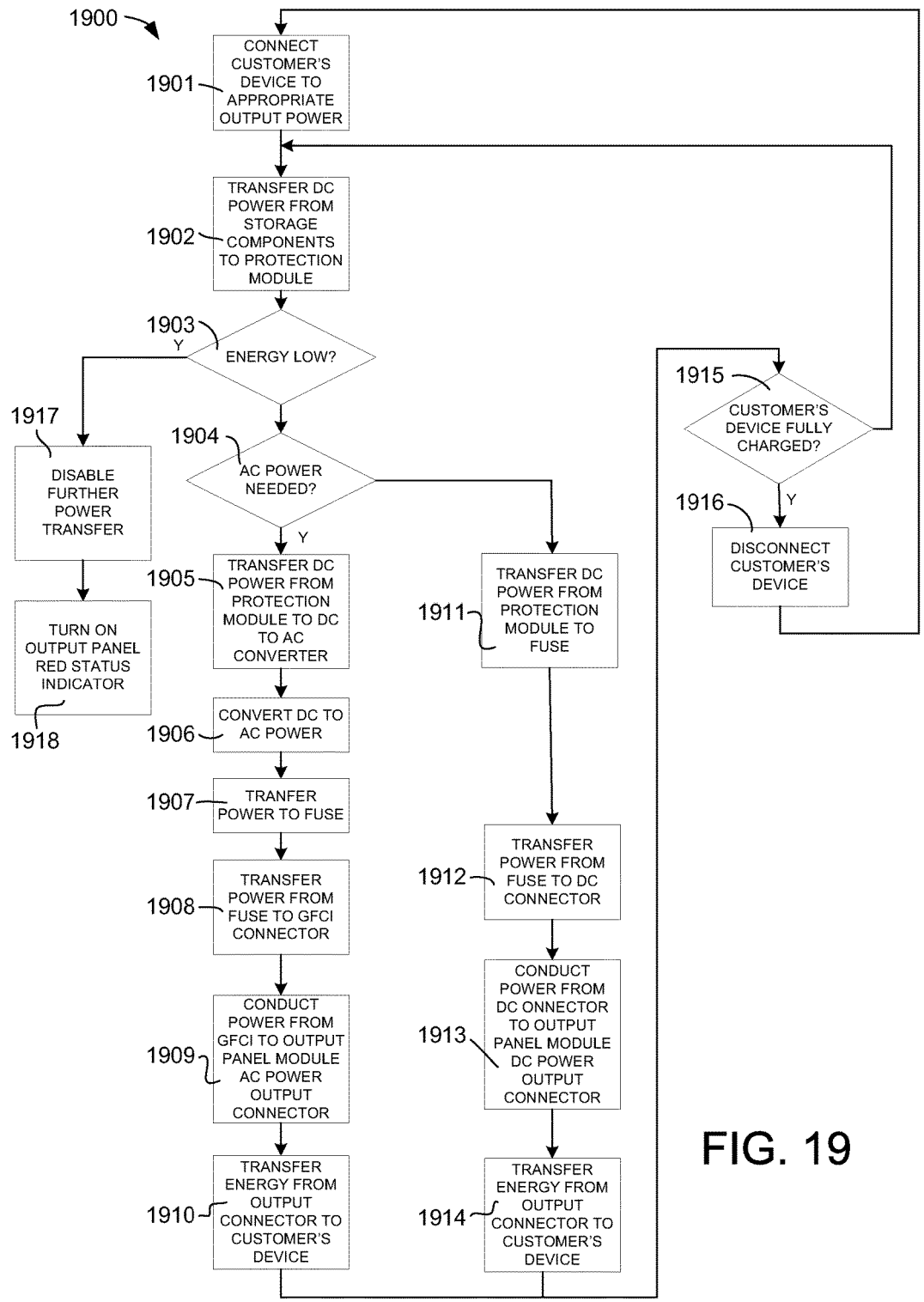
FIG. 19 is a detailed diagram of the process of charging a customer device.

As mentioned previously, the transportable power plant provides the features and functions that work in conjunction with the operator to enable the business process. FIG. 19 depicts the process by which the energy transfer is controlled from the on-board energy modules to the customers' devices being charged.

Upon completion of charge as indicated by either the phone, phone charging device, or simply the amount of elapsed time on charge, the operator may declare the charging to be complete, step 1814, disconnect the phone, step 1815 and return it to the customer in exchange for an appropriate fee payment for the charging service, steps 1816 and 1817.

Additional phones may be accepted for charging replacing phones that have been already charged and removed. This process can continue until the energy in the onboard energy modules is completed depleted at step 1818. Without any incremental power input, it is envisioned that 100 to several hundred or more phones may be charged depending on the number and type of energy modules on board. It should also be noted that, when input power is available such as solar or grid power, it may be connected during the charging operations to extend charging capability indefinitely.

The operator may monitor the amount of energy in the onboard energy modules by measuring the DC output voltage of the module at any available DC output connector at any time.

Once stored energy is completely depleted or the hours for operation have expired the opportunity to recharge the onboard energy modules is imminent. This can be accomplished by continued solar charging if sunlight remains viable, plugging into a grid powered electricity outlet, or exchanging modules, step 1824. In the latter case, spent energy modules are removed by first disconnecting the quick-connect style connections to the power input, power output, and control and status connectors. The disconnected energy module can then be lifted out of the energy module receiving structure bay and optionally placed on charge. A previously externally charged energy module can then be inserted and connected to the power, control, and status connections. The module is then ready for use.

The flexible options for recharging the plant allows operation to continue more or less around the clock if so desired. This allows prioritization of recharging. For example, lights needed at night can be recharged during daylight hours and cell phones needed during the day can be preferentially recharged during night time hours.

FIG. 19 is the process flow 1900 by which the plant charges customer devices. Once the operator accepts a customer's device for charging at step 1810 the device is connected to the appropriate power outlet, steps 1812 and 1901. DC power is delivered from the energy storage modules 815 via positive bus bar 814 to the protection circuit 808 as in step 1902. The protection circuit measures the state of charge of the energy storage modules and, if the energy level is not low at step 1903, delivers power to either the AC or DC output branch of the system at step 1904. If, however, the energy level is low at step 1903, the protection module disables any further transfer of power to the output branches, step 1917, and the red LED on the output panel is illuminated indicating low energy.

If the customer's device requires AC power at step 1804, DC power is delivered from the protection module to the DC to AC converter module, step 1905. DC to AC converter module converts the power to AC form at step 1906 and delivers the AC power to the AC fuse at step 1907 and hence to the GFCI connector at step 1908. From the GFCI connector power is conducted to the customer's device attached to an AC output connector at the output panel module in step 1910. If the customer's device is fully charged, the device may be disconnected at steps 1915 and 1916 and returned to the customer as in FIG. 18. If not fully charged, the process repeats beginning with the protection module at step 1902.

If the customer's device requires DC power, a similar process is implemented in steps 1911 through 1914 without the need of the DC to AC conversion step and with power following the DC paths to a DC connector at the output panel module instead of the AC paths as described in the previous paragraph. The same steps are followed when the customer's device is fully charged or when the protection module determines the energy level is too low to continue.

Figure 20:
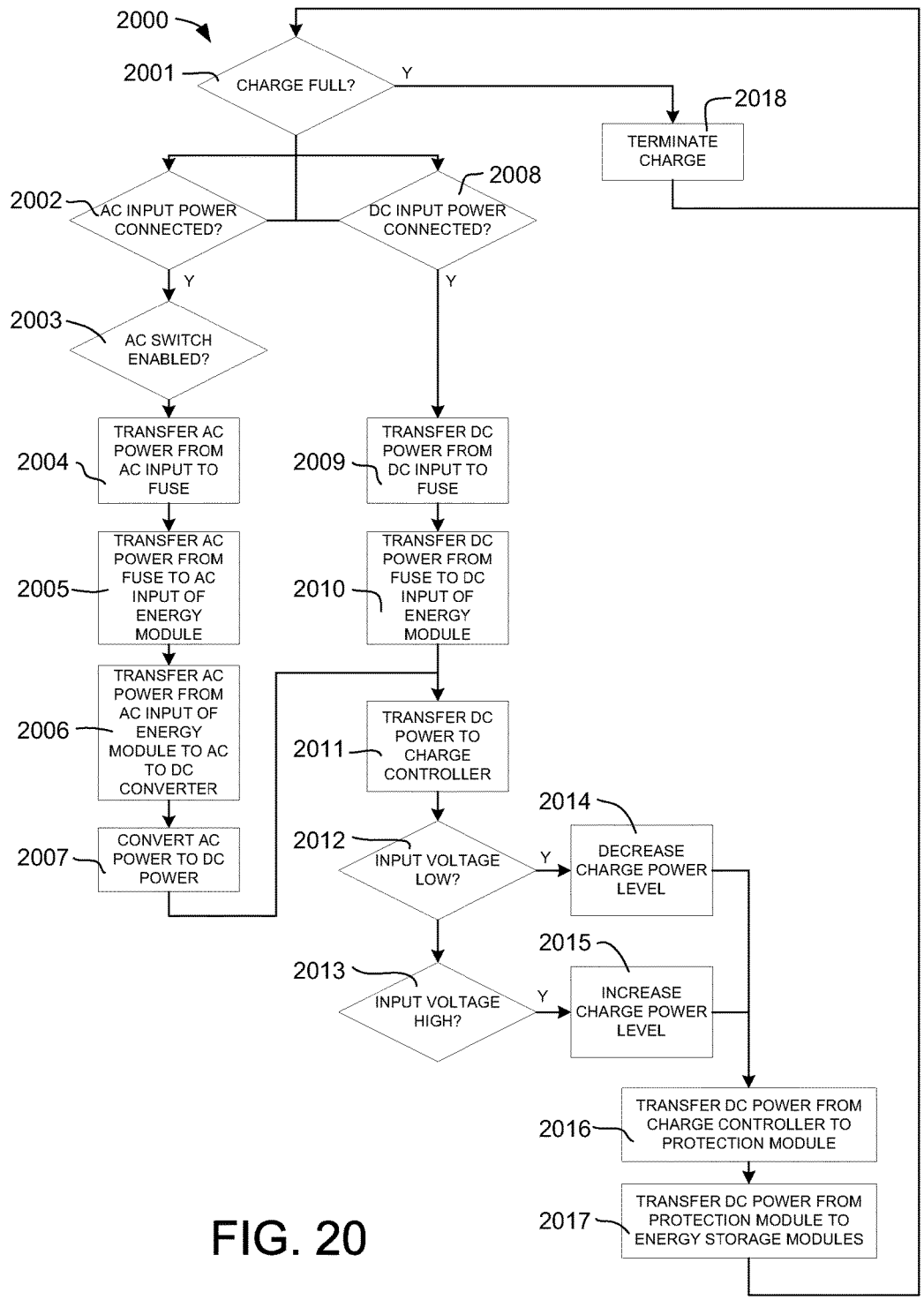
FIG. 20 is a detailed diagram of the process of charging the plant energy modules.

Once the energy stored in the plant is depleted it must be replenished (recharged). As mentioned previously, energy replenishment can also occur continuously during plant operation even if the energy stored is not much depleted. FIG. 20 is a process flow 2000 depicting the details of the recharging of the energy modules of the plant. Given that the energy storage modules are not fully charged at step 2001, the system determines whether input power is connected. As mentioned throughout, input power can come in the form of AC power from the grid, portable generators, or other AC sources, or DC power from the integral photovoltaic panels, auxiliary PV panels, external batteries or vehicles, or other DC sources. If an AC power source is connected at step 2002 and the AC input power switch is enabled at step 2003 then the AC input power is transferred to the fuse at step 2004. From the fuse, the AC input power routes to the AC input connector of the energy module, step 2005, and on to the AC to DC converter module, step 2006. The AC to DC converter module performs the power conversion, step 2007, and the resulting DC power is routed on to the charge controller at step 2011.

If a DC power source is connected at step 2008, the DC power is routed through the fuse, step 2009, and on to the DC input connector of the energy module at step 2010. From there it arrives, along with any DC power from other sources, at the charge controller, step 2011. The charge controller implements a peak power tracking process with the goal of extracting the maximum power from whichever input power sources are available. To achieve this, the charge module sets a charge power level higher or lower based upon whether the input source voltage is higher or lower than a given threshold, respectively. This sub-process is depicted in steps 2012, 2013, 2014, and 2015. Once an optimum charge level is decided, the charge controller transfers charge power to the protection module at step 2016. The protection module then delivers the charge energy via the positive bus bar to the energy storage modules, step 2017. From here, the process repeats checking whether full charge has been achieved at step 2001. When full charge is achieved, no further input power is transferred to the energy modules and the process is suspended via step 2018.

All the while the above-described charge process is proceeding, the system can concurrently transfer energy via the process described in FIGS. 18 and 19. Whether the energy stored in the energy storage modules increases, decreases, or remains at a constant level depends on the balance of energy being delivered from power inputs versus delivered to customer devices.

The invention described herein has been set forth by way of example only. Those of average skill in the art will readily recognize that changes may be made to the invention without departing from the spirit and scope of the invention as described in the text and figures of this disclosure.

The invention claimed is:

1. A process for operating a transportable power plant;
said transportable power plant comprises a customer device, an energy storage component, protection module, a DC to AC converter, a fuse, a GFCI (Ground Fault Circuit Interrupter) module, a first energy output connector, and a second energy output connector, comprising the steps of:
connecting said customer device to said second energy output connector;
transferring energy from said energy storage component to said protection module;
determining whether there is sufficient energy in said energy storage component to allow energy to be extracted without damaging said energy storage component;
transferring allowable energy from said protection module to said DC to AC converter;
converting said allowable energy from a DC energy to AC energy;
transferring said AC energy to said fuse;
transferring said AC energy from said fuse to said GFCI module;
transferring said AC energy from said GFCI module to said first energy output connector;
transferring said AC energy from said first energy output connector to said second energy output connector;
charging said customer device connected to said second energy output connector;
testing whether said customer device is fully charged;
continuing when said customer device is not fully charged with the step of transferring energy from said energy storage component to said protection module.

2. A process for operating a transportable power plant as claimed in claim 1 comprising the further step of determining whether said energy storage component is in a fully charged state.

3. A process for operating a transportable power plant as claimed in claim 2 wherein said transportable power plant further comprises a DC electrical input power source, a second fuse, an electrical energy input connector, a charge controller, a charge power level, and an input voltage threshold, comprising further the steps of:
- transferring power from said DC electrical input power source to said second fuse when said energy storage component is not in said fully charged state;
- transferring power from said second fuse to said energy input connector;
- transferring power from said energy input connector to said charge controller;
- comparing the energy input connector voltage to said input voltage threshold;
- increasing or decreasing said charge power level when said energy input connector voltage is less than or greater than said voltage threshold respectively;
- transferring said charge power level to said protection module;
- transferring said charge power level from said protection module to said energy storage component.

4. A process for operating a transportable power plant as claimed in claim 3 wherein said transportable power plant further comprises an AC electrical input power source, a third fuse, and a second electrical energy input connector, comprising further the steps of:
- transferring power from said AC electrical input power source to said third fuse when said energy storage component is not in said fully charged state;
- transferring power from said third fuse to said second energy input connector;
- transferring power from said second energy input connector to said charge controller.

* * * * *